United States Patent [19]

Taleyarkhan

[11] Patent Number: 4,770,843
[45] Date of Patent: Sep. 13, 1988

[54] CONTROLLING FUEL ASSEMBLY STABILITY IN A BOILING WATER REACTOR

[75] Inventor: Rusi P. Taleyarkhan, Plum Borough, Pa.

[73] Assignee: Westinghouse Electric Corp., Pittsburgh, Pa.

[21] Appl. No.: 35,831

[22] Filed: Apr. 8, 1987

[51] Int. Cl.$^4$ .............................................. G21C 7/00
[52] U.S. Cl. .................................... 376/216; 376/217; 364/149; 364/166; 364/138; 364/556
[58] Field of Search ....................... 376/215, 216, 217; 364/149, 153, 166, 185, 138, 141, 492, 556, 578

[56] References Cited

U.S. PATENT DOCUMENTS

| | | | |
|---|---|---|---|
| 4,318,778 | 3/1982 | Musick | 376/216 |
| 4,319,959 | 3/1982 | Monta | 376/245 |
| 4,330,367 | 5/1982 | Musick | 376/245 |
| 4,333,797 | 6/1982 | Nishizawa | 376/210 |
| 4,637,910 | 1/1987 | Impink | 376/216 |

FOREIGN PATENT DOCUMENTS 81029258 7/1984 Sweden .

OTHER PUBLICATIONS

Taleyarkhan, et al.,; Nuc. Eng. & Design 93 (1986) 39-50, "A Stability Analysis of Ventilated Boiling Channels".

*Primary Examiner*—Donald P. Walsh

[57] ABSTRACT

A method and apparatus for controlling the stability of a boiling water reactor using a digital computer to calculate on-line, from distributed steady state values of only power, flow, enthalpy and pressure; a stability index for selected fuel assemblies taking into account nuclear feedback as well as detailed hydrodynamic effects. Such calculations are only made for fuel assemblies selected as most susceptible to instability on the basis of the level and axial distribution of power generated. If the least stable fuel assembly is unstable, its stability index is iteratively recalculated using assumed incremental changes in either flow or control rod position until a stable condition is indicated. The cumulative adjustment in flow or rod position required for stability is reported to the operator and can be implemented manually or by an automatic control system.

13 Claims, 4 Drawing Sheets

CONTROLLING FUEL ASSEMBLY STABILITY IN A BOILING WATER REACTOR

BACKGROUND OF THE INVENTION

1. Field of the Invention

This invention relates to a method and apparatus for accurately determining on-line, and controlling, the stability of the individual fuel assemblies in a boiling water reactor. More particularly, it relates to selecting the fuel assemblies most likely to exhibit instability and performing a stability analysis based on physical solution of the non-linear conservation equations which takes into account nuclear feedback as well as hydraulic effects on the individual fuel assemblies with the effects of cross-coupling included when appropriate. The invention further relates to determining control action required to return a core with unstable fuel assemblies to stable operation, thus providing an effective on-line expert system in real time.

2. Background Information

Boiling flow instabilities must be considered in the design and analysis of many devices used in energy production. In particular, such instabilities should be avoided in most apparatus of interest. Sufficiently large excursions and/or oscillations from the steady state can affect the efficiency of the process, erode thermal margins, and may cause physical damage to mechanical components.

Flow instabilities are of particular concern in boiling water reactor (BWR) cores. BWR plant operators are under strict Nuclear Regulatory Commission guidelines to be alert for, and to suppress, any flow/nuclear instability. Monitoring is typically done by observing neutron flux signals from local power range monitors (LPRMs), and simultaneously adjusting power/flow conditions to remain below a prespecified core stability limit. In the event that an oscillation is noticed in the LPRM signals, the operator inserts control rods or increases total core flow to attempt to suppress instabilities. Additional control action is then required to bring the plant into a desired configuration.

The LPRMs in a BWR are arranged in strings distributed across the reactor core, and a typical BWR may have 160 such detectors. While this means that the operator must monitor a large numer of readings, there are still many fuel assemblies which are not adjacent to an LRPM. This can lead to a safety problem in the form of fuel damage, and release of fission products could also occur, should a fuel assembly some distance away from an LPRM string undergo sustained regional instabilities. Such instabilities may not be detected by the LPRM signals, and hence go unnoticed. Thus, the practice of controlling instabilities through monitoring LPRM signals is cumbersome at best, and could lead to increased downtime and hence economic loss.

U.S. Pat. No. 4,319,959 suggests a system for supervising stability in a BWR in which flux readings from the LPRMs, and signals regarding such operating conditions as rod position, the flow quantity of recirculation water and the thermal power of the core determined by the heat balance of the plant, are used to determine values for the coolant flow quantity and thermal power in each assembly. Channel stability of each assembly is then determined using an equation which takes into account hydrodynamic factors such as inlet flow velocity, inlet subcooling, heat flux, and mean pressure. However, axial distribution of power, cross flow between channels of subchannels, and nuclear feedback effects are not considered. In one embodiment, a correlation of signals from LPRMs spaced along a channel is used to determine flow rate. Indications of channel stability can be used as a guide for adjusting control rod position to improve stability. Such an approach uses lump parameters for assemblies adjacent LPRMs and can not provide meaningful indications of stability in assemblies remote from an LPRM. It also requires calculation of stability for all of the assemblies to locate any that might be unstable.

It is a primary object of the present invention to provide a method and apparatus for controlling the stability of the fuel assemblies in a boiling water reactor which provides an accurate quantitative evaluation of stability based upon physical laws in real-time for on-line implementation.

It is a another object of the invention to achieve the first object by selecting for the accurate quantitative evaluation of stability a limited number of fuel assemblies most susceptible to instability based upon current observed operating conditions of the core.

It is yet another object of the invention to provide such a method and apparatus which generates and uses, in said selection and evaluation, distributed values of pertinent core parameters.

It is still another object of the invention to provide a method and apparatus which evaluates stability taking into account the nuclear feedback as well as hydrodynamic effects on the stability of the individual fuel assemblies.

Finally it is an object of the invention to provide an expert system environment to the plant operator which suggests ways to obviate unstable operation and also to safely recover from unstable operating modes.

SUMMARY OF THE INVENTION

These and other objects are realized by the invention in which the stability of the fuel assemblies is controlled by measuring on an on-line basis reactor parameters including flow, temperature, control rod position and pressure. A digital computer utilizes these measurements to generate nodal distributions of selected reactor parameters with at least one node per fuel assembly in the radial plane and a plurality of nodes in the axial direction. The computer then calculates from these nodal distributions a stability index for selected fuel assemblies taking into account core physical parameters which are a measure of power level, axial power distribution, flow, enthalpy, void drift, detailed fuel rod dynamics, nuclear reactivity feedback, and where appropriate, flow cross-coupling in the radial and axial directions. The stability indexes, which in the preferred form of the invention are decay ratios, are reported to the operator. The stability of the least stable fuel assembly is, in addition, compared to a prdetermined stability index. If this stability index limit is exceeded by the least stable fuel assembly, the computer iteratively assumes incremental changes in either control rod position or coolant flow, as selected by the operator, and recalculates the stability index until the index is within the prescribed limit. While the calculations are detailed in taking into account the nuclear feedback as well as hydrodynamic effects on stability, they are carried out rapidly to provide recommendations for real-time adjustments in flow or control rod position. The cumulative adjustment needed to return the least stable assembly to stable operation is reported to the operator, who may make the recommended change in flow or rod position manually at his discretion. Alternatively, the recommended change in flow or rod position can be provided as a control signal to a controller which automatically makes the required parameter change.

As another aspect of the invention, the number of fuel assemblies for which stability calculations need to be generated by the digital computer is reduced to those most susceptible to instability based upon current operating conditions. To this end, the power generated by each assembly, and the axial distribution of power, including the axial location of the peak power in each assembly, are determined. Only those assemblies generating power above a certain level, preferably above the average level of power generated in all the assemblies, and having their peak axial power occur at a location below the average location for all fuel assemblies are selected for stability calculations. This reduces the number of assemblies for which the stability calculations must be made from several hundred to about a dozen or less. With such a manageable number of fuel assemblies, the detailed calculations can be carried out in time for real-time control of fuel assembly stability.

The invention relates to both the above method and apparatus for controlling stability in a boiling water reactor.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figures 1, 2:
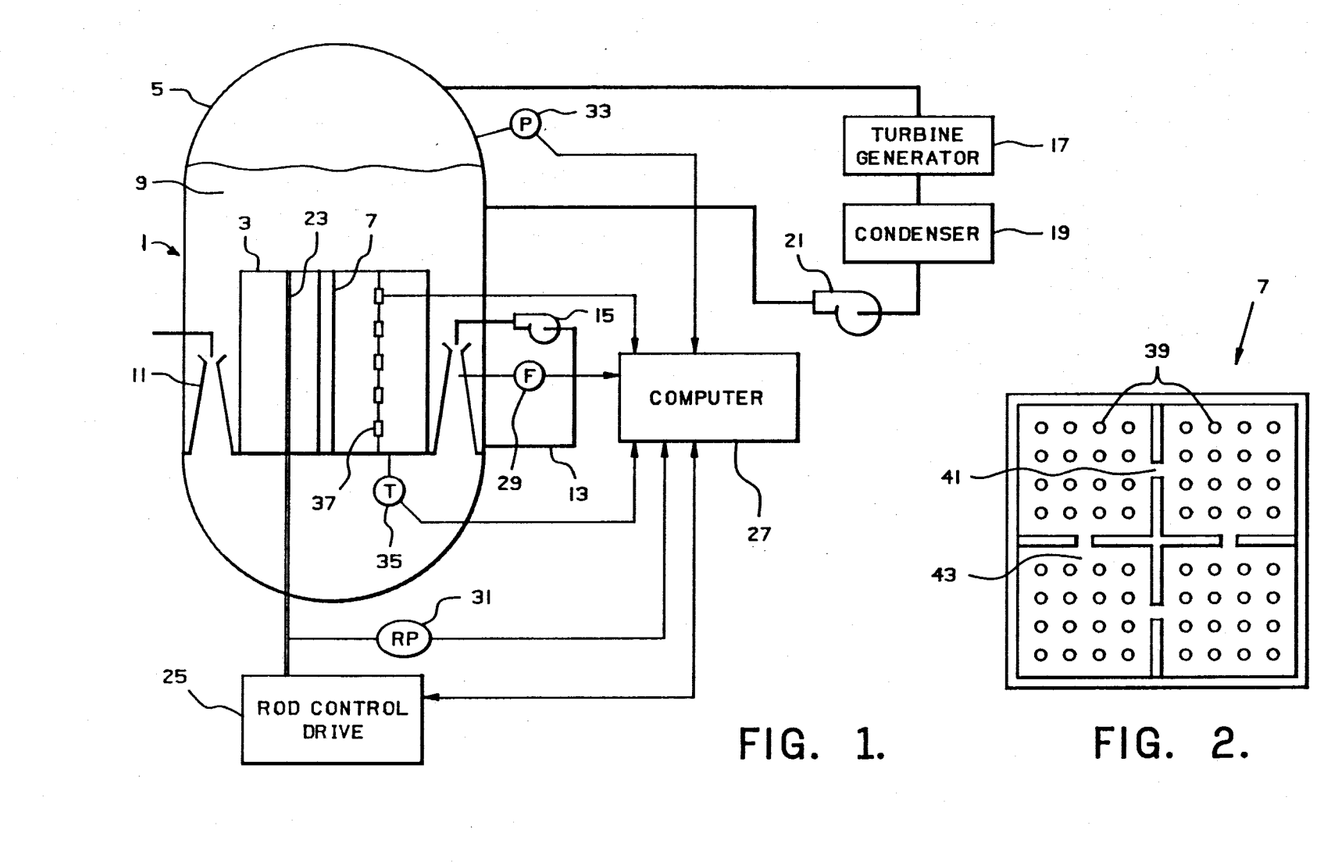
FIG. 1 is a schematic diagram of a boiling water reactor to which the invention is applied.
FIG. 2 is a schematic section through a type of fuel assembly that could be used in the core of the boiling water reactor illustrated in FIG. 1.

FIG. 1 illustrtes a typical boiling water reactor (BWR) 1 which comprises a reactor core 3 housed inside of a pressure vessel 5. The core 3 includes an array of elongated rectangular fuel assemblies or bundles 7 (only one shown) each of which includes a number fuel rods containing fissionable material. Reactor coolant 9 in the form of light water is circulated through the core 3 with the assistance of jet pumps 11. The jet pumps 11 in turn are driven by coolant recirculated through recirculating piping 13 by a recirculating pump 15. The water circulated through the core 3 is converted to steam by the heat generated by the fission reactions. The steam is utilized to drive a turbine generator 17 which produces electric power. Steam exhausted from the turbine generated 17 is condensed in condenser 19 and returned to the pressure vessel by a feedwater pump 21.

The power generated by the reactor 1 is controlled in a well known manner through regulation of the flow of reactor coolant 9 through the core 3. This flow is controlled, in turn, by regulation of the speed of the recirculation pump 15. In practice, several jet pumps 11 are provided, but only two are shown in FIG. 1 to explain the principles of operation of the reactor 1. The thermal output of the reactor is also controlled by control rods 23 (again only 1 shown for clarity) made of neutron absorbing material which are inserted into and withdrawn from the reactor core by a rod control drive 25.

A combination of reactor coolant flow and control rod position in used to operate the reactor at a desired power level, while maintaining prescribed limits on power distribution, under the control of a computer 27. The computer 27 monitors measurements of various parameters for use in controlling the reactor, including: feedwater flow as measured by flow meter 29, rod position as reported by rod position indicators 31, dome pressure as measured by pressure transducer 33, core inlet temperature as measured by temperature detectors 35, neutron flux as recorded by a plurality of strings of local power range monitors (LPRMs), or detectors, 37 distributed across the core (only one string shown), and other parameters not pertinent to this invention.

FIG. 2 illustrates in plan view an advanced type of BWR water-cross fuel assembly 7 in which four mini-bundles of 4×4 arrays of fuel rods 33 communicate with one another laterally through ventilation holes 41 in a cruciform partition 43. The present invention takes into account such cross flow in determining the stability of the fuel assemblies 7. Normal BWR fuel assemblies are of the open lattice type without the partitioning as shown in FIG. 2, assembly 7. The present invention accommodates both designs.

In a boiling system, such as BWR fuel assembly, the vapor voids act as compressible volumes that can expand and collapse. These bubbles are in constant motion, expanding and contracting. These oscillations are dampened by the forces of friction, et cetera. If the energy being pumped into such a boiling system is not dissipated/dampened the oscillations in the two-phase flow and nuclear power increase in amplitude and eventually undergo self sustained oscillations, of a specific magnitude dependent on certain key parameters such as power level, power shape, orificing/internal damping, nuclear feedback, pressure et cetera. Such a sustained oscillation is referred to as unstable operation, and must be carefully guarded against. Sustained unstable operation can cause fuel failure, safety violations, and also mechanical damage to core components.

The present invention provides an on-line system for not only determining the stability of the individual fuel assemblies in a BWR, with or without cross-flow, but also for determining a course of action, which can be implemented automatically or by an operator, to steer the reactor to a condition wherein the stability margin of all the fuel assemblies is within prescribed limits.

In order to determine the quantitative value of the stability of the individual fuel bundles in a BWR in real-time, on-line, it is necessary to have a fast and reliable algorithm for modeling the system. The mathematical model used in the invention is described at length in an article entitled "A Stability Analysis of Ventilated Boiling Channels", by R. P. Taleyarkham, M. Z. Podowski and R. T. Lahey, Jr. published in Nuclear Engineering and Design, 93, (May 1986) 39-50, Elsevier Science Publisher B. V. (North-Holland Physics Publishing Division), Amsterdam, Holland. This is a nodal model which accounts for subcooled boiling, an arbitrary heat flux distribution, distributed and local hydraulic losses, heated wall dynamics, void slip flow, turbulent mixing and arbitrary flow paths for transverse ventilation. The model is represented by a system of differential equations which can be written in matrix form. This matrix is reduced using a special matrix reduction scheme described in the above article. Further experience with the physical nature of the cross-connected system has indicated a further means of optimizing the matrix reduction process. It was found that cross-flow inertia in the axial direction has a negligible impact on stability. This aspect allows for matrix size reduction and thereafter for substantial savings in computation time (approximately 20%) - further speeding up the process. The resultant relationship derived by the model for analyzing channel stability is:

$$\delta \Delta \hat{P}_t = G_1(S) \delta \hat{W}_T \qquad \text{(Equation 1)}$$

where:
- $\Delta P_t$ = the total pressure drop from the inlet to the outlet of the channel;
- $W_t$ = the total flow through the channel; and
- $G_1(S)$ = a transfer function.

Equation 1 is a scalar equation in which the transfer function, $G_1(S)$, is an element of the matrix. While this equation takes into account the hydrodynamic effects on channel stability, it has been found that considering only such effects can lead to sizeable inaccuracies in quantifying stability of a "Boiling Water Nuclear Reactor". Accordingly, equation (1) should be modified to take into account nuclear feedback effects. The resultant solution for the generalized matrix, using the matrix reduction scheme, produces the following equation:

$$\delta \Delta \hat{P}_T = G_1(S) \delta \hat{W}_T + G_2(S) \delta \hat{\gamma} \qquad \text{Equation (2)}$$

where:
- $\gamma$ = is a time varying component of internal heat/power generation;
- $G_2(S)$ = a second transfer function; and the remaining terms are as described above.

In order to examine the variation attributes of $W_T$ for stability margin evaluation, $\delta \hat{\gamma}$ must be expressed in terms of $\delta \hat{W}_T$. This involves incorporating the effects of nuclear reactivity feedback. This is accomplished as follows:

Step 1

A relationship is obtained relating the void fraction perturbation for each node in terms of the nodal flow and enthalpy for the radially averaged system.

Step 2

Next, expressions are obtained through perturbed mass and energy conservation equations, such as those given in the reference paper, for the perturbed flow and enthalpy for each node in terms of the total perturbed inlet flow rate/enthalpy entering the channels, and $\Delta \gamma$, using the special matrix reduction scheme.

Step 3

The equations for the perturbed nodal void fractions (from step 1) are now transformed so that the perturbed void fraction for each node can be expressed in terms of the channel inlet flow rate/enthalpy perturbation. That is, we now obtain for each node i:

$$\delta \alpha_i = f(\delta \hat{W}_t, \delta \hat{h}_{in}, \delta \hat{\gamma}) \qquad \text{Equation (3)}$$

where:
- $\alpha_i$ = perturbed void fraction for ith node
- $h_{in}$ = inlet enthalpy The overall averaged void fraction, $\delta \hat{\alpha}$ perturbation can now be obtained from:

$$\delta \hat{\alpha} = \frac{1}{L_H} \sum_{i=1}^{k} \delta \hat{\alpha}_i \Delta z_i \qquad \text{Equation (4)}$$

where:
- $L_H$ = heated length
- $\Delta z_i$ = nodal length or $$\delta \hat{\alpha} = T_1(S) \delta \hat{W}_T + T_2(S) \delta \hat{\gamma} + T_3(S) \delta \hat{h}_{in} \qquad \text{Equation (5)}$$

The expression for $\delta \hat{\alpha}$ is next related to the nuclear reactivity kinetics and void feedback to obtain, assuming constant inlet enthalpy:

$$\delta \hat{\gamma} = R(S) \delta \hat{W}_T \qquad \text{Equation (6)}$$

where:

$$R(S) = \frac{\phi \, C_\alpha \, k_o \, T_1(S)}{[1 - C_\alpha \, k_o \, T_2(S)]}$$

- $\phi$ = Kinetics transfer function
- $C_\alpha$ = void reactivity coefficient
- $k_o$ = reactivity Equation 6 is now implemented into equation (2) to obtain $$\delta \Delta \hat{P}_T = G(S) \delta \hat{W}_T \qquad \text{(Equation) (7)}$$

where:

$$G(S) = G_1(S) + G_2(S) R(S) \qquad \text{Equation (8)}$$

Equation (7), as formulated, represents the overall characteristic equation to be submitted to nuclear - hydraulic stability margin analysis. The transfer function G (S) is a complex polynomial obtained from the matrix. The eigenvalue of G(S) having the most positive real part in the frequency range of interest to BWR operation is determined, such as by using complex mapping theory, and is a measure of the stability of the associated assembly. A suitable stability index, preferably the decay ratio, is derived from this dominate eigen value of G(S). As is well known, a decay ratio, DR, of a value of one indicates the onset of instability, with increasing values above 1 indicating increased instability, and decreasing values below one indicating increased stability.

Figure 3:
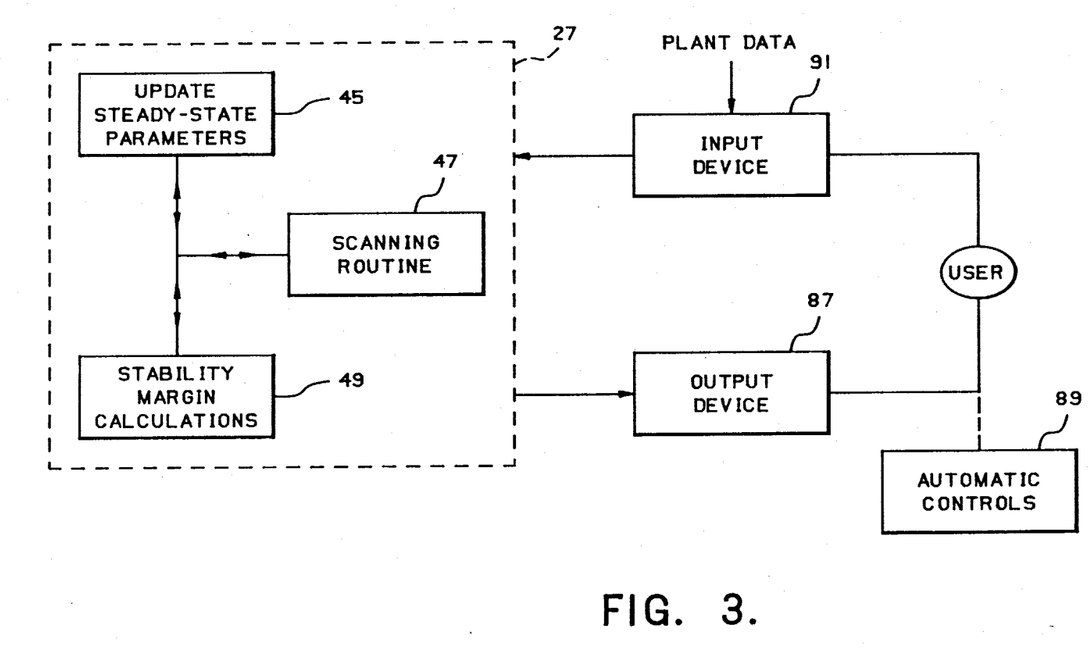
FIG. 3 is a block diagram of a system in accordance with the invention for controlling the stability of the fuel assemblies in the core of the reactor of FIG. 1.

A system for implementing the invention utilizing the above model is illustrated in block diagram form in FIG. 3. The software, which may be executed in the plant process computer 27, includes a module 45 for updating the necessary steady-state parameters, a scanning routine 47, for selecting the fuel bundles most likely to experience instability, and a module 49 for carrying out the stability margin calculations. The module 45 uses on-line measurements of total flow, pressure, inlet temperature and control rod position to generate real time distributed values for a number of parameters with a radial mesh of one node per flow channel and an axial mesh of at least about 30 nodes for acceptable results, and preferably about 50 nodes. Each fuel assembly can be treated as a flow channel for stability calculation purposes, or if desired, sub channels within a fuel assembly can each be considered a separate flow channel. The distributed parameters calculated by the module 45 comprise: power level and shape, flow and enthalpy, void drift or slip, inlet subcooling, and reactivity constants. Computer codes for generating these distributed parameters are well known in the field.

The scanning routine 47 is an important part of the invention which reduces the number of fuel assemblies or flow channels for which stability calculations need to be made. It is based upon the fact that the stability characteristics of a nuclear assembly are very sensitive to the axial power distribution as well as the power level. Calculations show that assemblies with the highest power levels also take in the least amount of flow. This further aggravates the bundle stability characteristics. From the standpoint of monitoring the BWR core for the prevention of the onset to instability, it is necessary, and sufficient, to only look at those assemblies which exhibit certain axial power distributions and high power levels. That is, analyze for stability, only those assemblies most susceptible. This avoids a brute force approach of evaluating all assembly locations for instability, provides accurate results with a minimum of computational effort on demand within seconds while simultaneously enveloping the remainder of the core, and provides a basis for additional calculations to guide the operator on how much and in what direction to change power/flow/control rod patterns.

Figure 4:
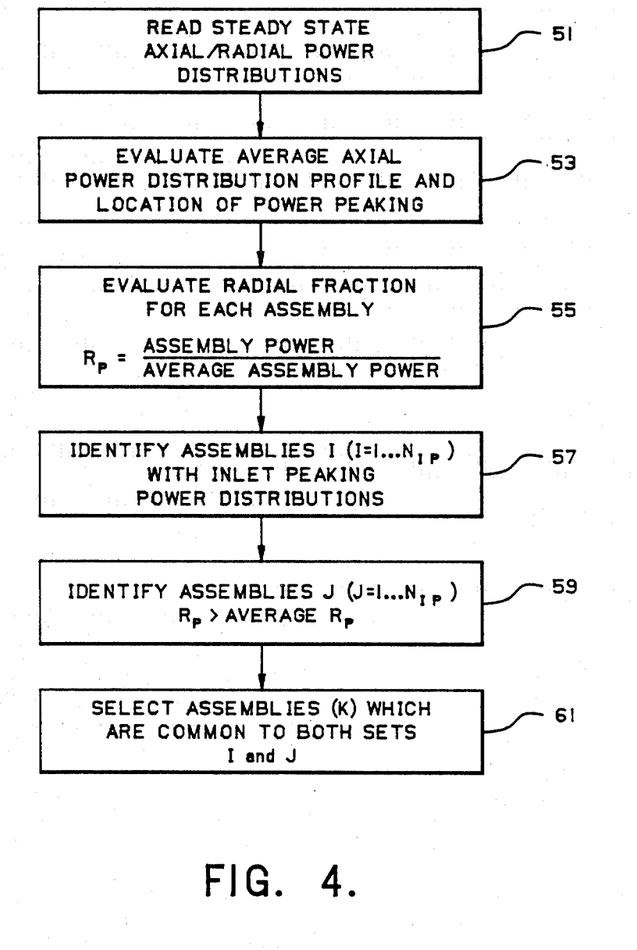
FIG. 4 is a flow diagram of a scanning routine in accordance with the invention for determining the fuel assemblies most susceptible to instability under current operating conditions.

A flow chart of the scanning routine 47 is shown in FIG. 4. As indicated at 51, the real time steady state axial and radial power distributions generated by the module 45 are read. The axial power distributions for all of the assemblies are evaluated at 53 to determine the average axial power distribution profile and the axial location of power peaking. Next the radial power distribution is analyzed at 55 to determine the radial power fraction for each fuel assembly in accordance with the relationship.

$$R_{pi} = \frac{\text{assembly power}}{\text{average assembly power}}$$

and to determine the average power per fuel assembly. Those assemblies with the location of the peak of the axial power distribution below the average axial lcoation for all assemblies are are identified as assemblies with inlet peaking power distributions at 57. Similarly, those assemblies with a radial power fraction $R_p$, which is greater than the average for all assemblies (i.e. $R_p > 1.00$), are identified at 59. Finally, the assemblies which are identified both at 57 as having inlet peaking axial power distributions, and at 59 as having above average power levels, are selected at 61 for stability analysis. While a typical BWR would have 700–800 fuel assemblies, each of which would be analyzed for stability under current practice, the scanning routine 47 reduces the number of assemblies to be analyzed in a typical situation to about 5 to 10.

Figure 5:
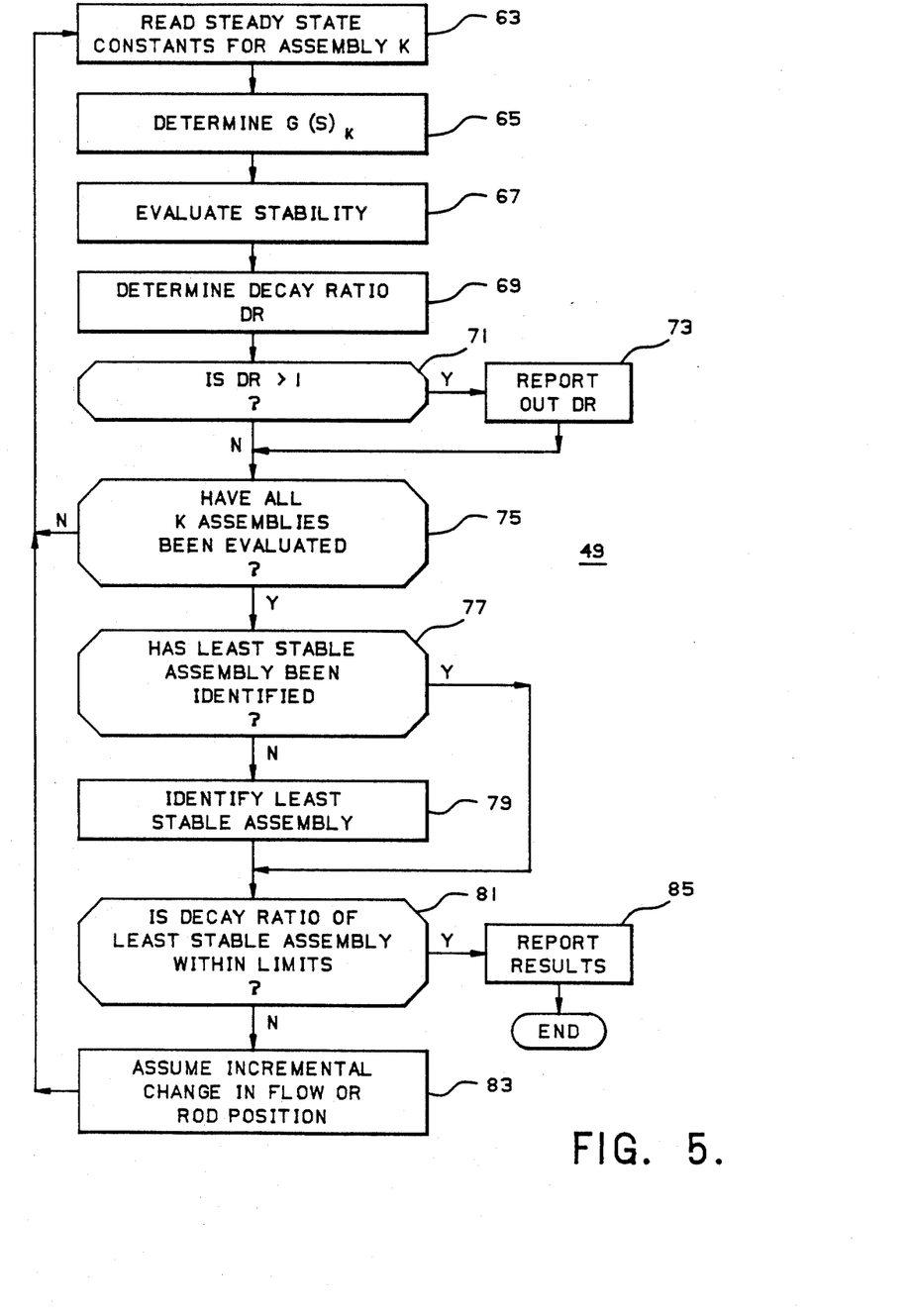
FIG. 5 is a flow diagram of a routine in accordance with the invention for determining the stability of the fuel assemblies most susceptible to instability and for determining control action required to return an unstable fuel assembly to stable operation.

Analysis of the fuel assemblies most susceptible to instability, as identified by the scanning routine 47 is carried out by the stability margin calculation routine 49, which is diagrammed in FIG. 5. The stability of each of the assemblies, k, selected by the scanning routine 47 is analyzed by reading the appropriate steady state constants for the assembly generated by the module 45 as indicated in block 63. Using these data the transfer function $G(S)_k$, for assembly k is determined at 65 using the techniques discussed above. The complex polynomial, $G(S)_k$, is then evaluated 67 to determine the characteristic root with the most positive real part, or most dominant eigen value, and a stability index, such as the decay ratio, DR, is calculated at 69. If the decay ratio is more than 1, indicating an unstable condition 71, a report is made immediately to the user 73. This procedure is repeated 75 for each of the K selected assemblies. The least stable assembly is then identified 77, 79 as the assembly, k, with the highest decay ratio.

If the highest decay ratio identified at 79 is greater than a preselected limit, nominally 1, as determined at 81, an incremental change is assumed for the least stable fuel assembly in rod position or flow at 83, as selected by the user, and a new $G(S)_k$ is calculated at 65 for evaluating stability at 67 and generating a new decay ratio at 69. The selected parameter, rod position or flow, is iteratively adjusted in this manner until the decay ratio is within the prescribed limits in block 81. Since the least stable assembly has been identified at this point, the iterative process bypasses the determination of the least stable assembly in 79 through the branching provided at 77. The decay ratios for the k assemblies, and where appropriate, an output signal representative of the suggested change required in rod position of flow to bring the stability of the assemblies within limits, are reported out to the user at 85.

If the user selects rod position as the parameter to be adjusted, the axial location of power peaking for the assembly being evaluated, is iteratively, incrementally shifted upward to determine what axial power profile will lead to a decay ratio of less than 1.0. The operator is then informed at 85 of what adjustments are necessary in the position of the control rod banks in order to obtain the necessary axial power profile.

If the user options for suggested changes in flow to reduce instability, the assembly with the highest decay ratio is iteratively analyzed at assumed flow rates increased by increments selected by the operator, or assumed as a preset value, such as say five percent. The power level at which these calculations are carried out is also increased at a rate corresponding to the established operating line on the power-flow map predetermined by the module 45. The combination of power and flow which brings the assembly decay ratio to less than 1.0 at 81 is reported to the operator at 85.

Returning to FIG. 3, the output of the stability margin calculation routine is transmitted to an output device 83 which can be a monitor which generates a visual representation for the user of the identification of the assemblies .analyzed, their stability margins, and any recommended action. The output device can also, or alternatively, comprise devices for making hard copies such a printers, and recorders or other storage devices. The output device may also comrise or include an interface for passing a control signal to automatic controls 85 for automatic implementation of the recommended control action to improve core stability.

The user can initiate a stability evaluation, indicate the parameter to be used in determining the amount of control action needed to increase stability, manually make the adjustment in flow or rod position suggested by the digital computer and otherwise control the program through input device 87. The input device 87 can be a keyboard, a touchscreen on the output monitor or any other suitable device. The input device also includes devices for automatically inputting the required data on the plant parameters used by the program. While the invention is illustrated in the exemplary embodiment as being implemented using the plane process computer 27, the program runs fast enough, and are compact enough, that they could also be implemented on a dedicated minicomputer or personal computer.

The described system provides an on-line effective expert system that is expected to take only a few seconds to execute. It is based upon accurate, physically based calculations which add structure to an otherwise cumbersome "black art" of trying to supress instabilities in a boiling water reactor. The benefits are economic savings from reduced down time, and improved flexibility and reactor control.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given to full breadth of the appended claims and any and all equivalents thereof.

What is claimed is:

1. A method of controlling the stability of the fuel assemblies in a boiling water reactor core comprising the steps of:
   (a) monitoring on an on-line basis the values of selected reactor parameters incuding, flow, inlet subcooling, control rod position, and pressure;
   (b) determining on a real time basis from the selected reactor parameters, the power generated in, and the axial power distribution for, each fuel assembly;
   (c) selecting fuel assemblies with axial power peaking occurring below a predetermined location as determined from said axial power distributions, and with a power level above a selected value;
   (d) calculating on-line in a digital computer a stability index only for said selected fuel assemblies; and
   (e) generating a human readable representation of the stability indexes in real time for the selected fuel assemblies.

2. The method of claim 1 wherein said step of selecting fuel assemblies comprises determining the average axial location of axial power peaking and the average power for all of said fuel assemblies, and selecting those fuel assemblies with axial power peaking occurring below said average axial location and with power above said average power.

3. The method of claim 1 including: determining the least stable fuel assembly from said stability indexes calculated for said selected fuel assemblies, comparing the stability index of the least stable fuel assemblies to a preselected stability limit, and where said stability index for said least stable fuel assembly exceeds the preselected limit:

iteratively calculating the stability index for said least stable fuel assembly incremental changes in a selected one of the axial power distribution and flow parameters until said stability index for the least stable fuel assembly is reduced at least to said preselected stability limit; and operating reactor controls to implement the cumulative change in the selected one parameter to bring the stability index for the least stable fuel assembly down to at least said preselected limit.

4. The method of claim 3 wherein said step of operating reactor controls to implement the cumulative change in the selected one parameter includes generating a control signal representative of the change required in the selected parameter and applying the control signal to an automatic controller to automatically effect the change in the selected one parameter.

5. The method of claim 3 wherein said monitoring step includes generating a real time power-flow map from said selected parameters and wherein said selected one parameter is flow, and said iterative calculations are carried out using incremental increases in flow and corresponding incremental increases in power determined from said power-flow map.

6. The method of claim 1 wherein said calculation of said stability indexes by said digital computer comprise nodal calculations with radially distributed nodes for each fuel assembly and a plurality of axially spaced nodes, and which incorporate nodal values of physical parameters which are a measure of nuclear feedback as well as the hydrodynamics of the flow channels.

7. A method of controlling the stability of the fuel assemblies in a boiling water reactor core comprising the steps of:
   (a) measuring on an on-line basis reactor parameters including, flow, temperature, control rod position and pressure,
   (b) operating a digital computer to generate from said measured reactor parameters, nodal distributions of selected reactor parameters with at least one node per fuel assembly in the radial plane and a plurality of spaced nodes in the axial direction; to calculate from said selected nodal distributions, a stability index for selected fuel assemblies, taking into account core physical parameters which are a measure of power level, axial power distribution, flow, enthalpy, void drift, detailed fuel rod dynamics, nuclear reactivity feedback and, where appropriate, flow cross-coupling in the radial and axial directions; to determine the least stable selected fuel assembly from said calculated stability indexes; and to interatively recalculate the stability index for an unstable least stable selected fuel assembly using assumed incremental changes in a selected one of the rod position and flow parameters until said recalculated stability index for the least stable fuel assembly represents a stable condition; and
   (c) generating output representations of the calculated stability indexes and of the cumulative change in said selected parameter required to make the least stable fuel assembly stable; and
   (d) adjusting the reactor controls to change said selected one parameter by said cumulative change to bring said least stable fuel assembly to a stable condition.

8. The method of claim 7 including operating said digital computer to select said fuel assemblies for which a stability index is calculated by determining for each fuel assembly, the power level, and from the axial power distributions, the location of the axial power peaking, and selecting those fuel assemblies with a power level above a preselected level and with axial power peaking occurring below a preselected axial location.

9. The method of claim 8 including operating said digital computer: to determine the average power level in said fuel assemblies and the average location of axial power peaking; and to select those fuel assemblies in which the power level is above said average power level, and in which axial power peaking occurs below said average location of axial power peaking.

10. A system for controlling instability in the fuel assembly of a boiling water reactor comprising:

means for measuring on-line, selected reactor parameters including: flow, temperature, control rod position and pressure;

a digital computer programmed: to identify in real time from the selected reactor parameters those fuel assemblies having inlet power peaking and above average power levels; to calculate only for the identified fuel assemblies a stability index taking into account hydrodynamic and nuclear feedback effects; and to generate output signals representative of said stability indexes; and means for generating human readable representations of said identified fuel assemblies and their stability indexes from said output signals.

11. The system of claim 10 wherein said digital computer is further programmed: to identify from the stability indexes the least stable fuel assembly; to iteratively recalculate the stability index for an unstable least stable fuel assembly using assumed incremental changes in a selected one of control rod position and flow parameters until the recalculated stability index for the least stable fuel assembly represents a stable condition; and to generate a control signal representative of the assumed cumulative change in the selected one parameter, said system including control means to which said control signal can be applied for changing the selected one parameter by the amount of the assumed cumulative change.

12. A boiling water reactor comprising:

a reactor core having a plurality of fuel assemblies;

control rods for adjusting the reactivity of said fuel assemblies in the reactor core;

flow control means for controlling the flow of reactor coolant through the fuel assemblies of the reactor core;

means for measuring selected reactor parameters including: flow, control rod position, temperature and pressure;

digital computer means programmed: to generate nodal distributions of selected reactor parameters, with at least one node per fuel assembly in the radial plane and a plurality of spaced nodes in the axial direction; to select, using said nodal distributions, fuel assemblies having their peak axial power at a location below a selected location and having a power level above a preselected level to calculate from said nodal distributions a stability index for said selected fuel assemblies taking into account physical parameters which are a measure of power level, axial power distribution, flow, enthalpy, void drift, detailed fuel rod dynamics, nuclear reactivity feedback, and where appropriate, flow cross-coupling in the radial and axial directions; to determine the least stable selected fuel assembly from the calculated stability indexes; to iteratively recalculate the stability index for an unstable least stable selected fuel assembly using assumed incremental changes in a selected one of the rod position and flow parameters until said recalculated stability index for the least stable fuel assembly represents a stable condition; and to generate a control signal representative of the cumulative assumed changes in the selected one parameter; and control means to which said control signal is selectively applied to change the selected one of rod position or flow by the assumed cumulative amount.

13. Apparatus for controlling the stability of the fuel bundles in a boiling water reactor comprising:

means for measuring on an on-line basis selected reactor parameters including flow, temperature, control rod position and pressure;

a digital computer programmed to: (a) determine the radial and axial power distribution on a per fuel bundle basis using said selected parameters, (b) determine the peaking location for the axial power distribution for each fuel bundle and the average power level for the fuel bundles, (c) determine the stability margins only for those fuel bundles for which axial power peaking occurs below the average peaking location and for which the power level is above said average power level, and (d) iteratively repeat step (c) using incremental adjustments in a designated one of the flow and rod position parameters to determine a change in the designated parameter required to bring the stability margins for the selected fuel bundles within designated limits; and means for implementing said change in the designated parameter.

* * * * *